United States Patent [19]

Christopher et al.

[11] 4,434,616

[45] Mar. 6, 1984

[54] HYDRAULIC WINCH SPEED CONTROL WITH PRESSURE-RESPONSIVE OVERRIDE

[75] Inventors: Terry M. Christopher; Randolph J. Nelson, both of Cedar Rapids, Iowa

[73] Assignee: FMC Corporation, Chicago, Ill.

[21] Appl. No.: 314,268

[22] Filed: Oct. 23, 1981

[51] Int. Cl.³ .............................................. F16H 39/46
[52] U.S. Cl. ........................................ 60/451; 60/445
[58] Field of Search ........................ 60/445, 450, 451

[56] References Cited

U.S. PATENT DOCUMENTS 3,478,513 11/1969 Ma et al. ................................ 60/451
4,139,987 2/1979 Budzich ............................. 60/451 X

*Primary Examiner*—Allen M. Ostrager
*Attorney, Agent, or Firm*—Lloyd B. Guernsey; Henry M. Stanley; Richard B. Megley

[57] ABSTRACT

A system for varying the speed and displacement of a variable-displacement hydraulic motor and for providing a feedback signal which prevents the motor from stalling when an operator tries to reduce the motor displacement below the stall level. The system is especially useful for operating a hydraulic winch system on a wire rope crane. A variable displacement hydraulic pump provides pressurized fluid to operate a variable displacement hydraulic motor for lifting loads supported by the wire rope. The motor speed is controlled by varying the displacement of the pump and/or the motor, with the motor speed generally increasing as motor displacement decreases. The motor could stall if the crane operator decreases motor displacement below a critical value. A feedback signal coupled to the motor controls the motor displacement to prevent motor stalls.

10 Claims, 5 Drawing Figures

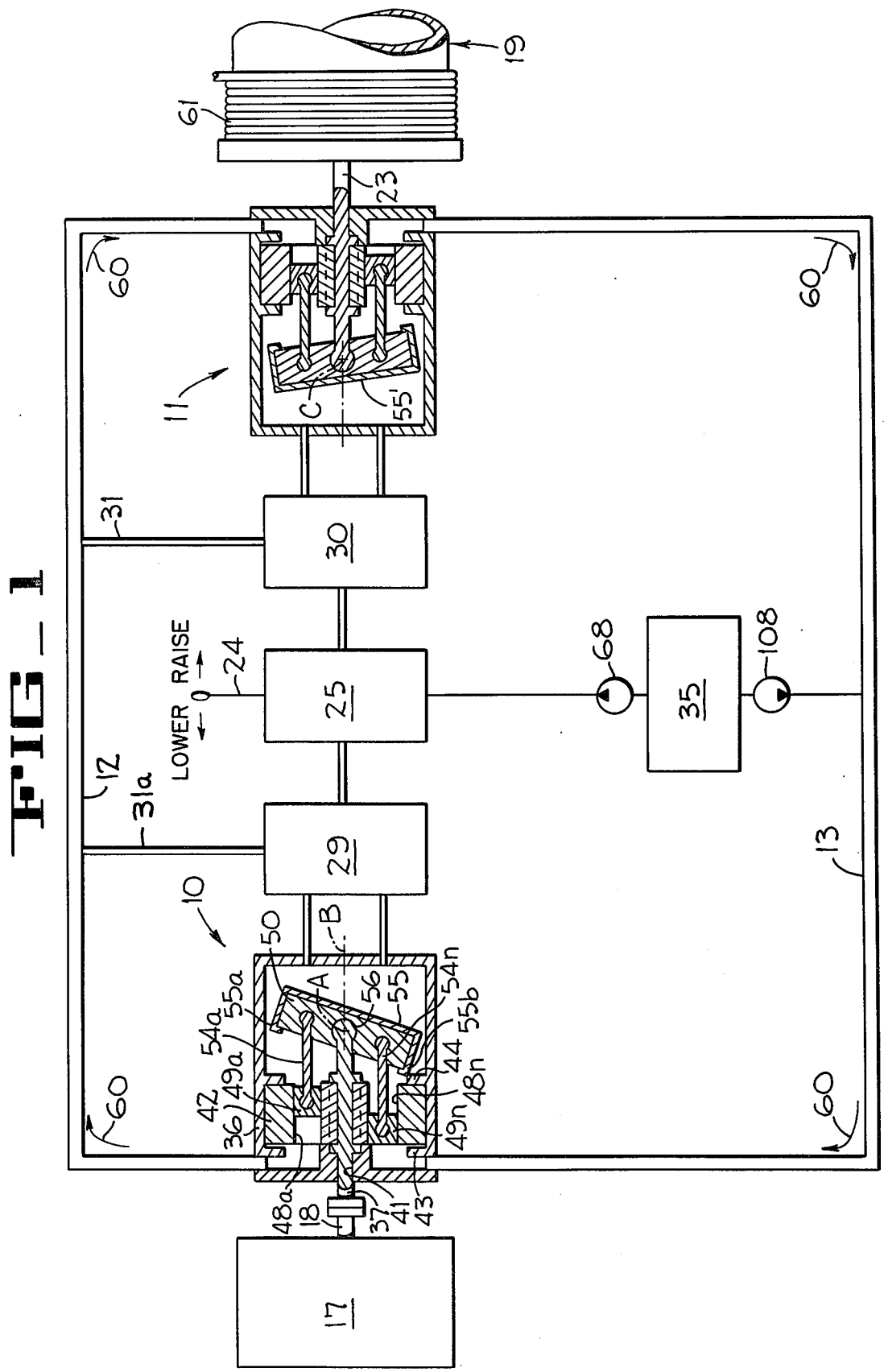
FIG_1

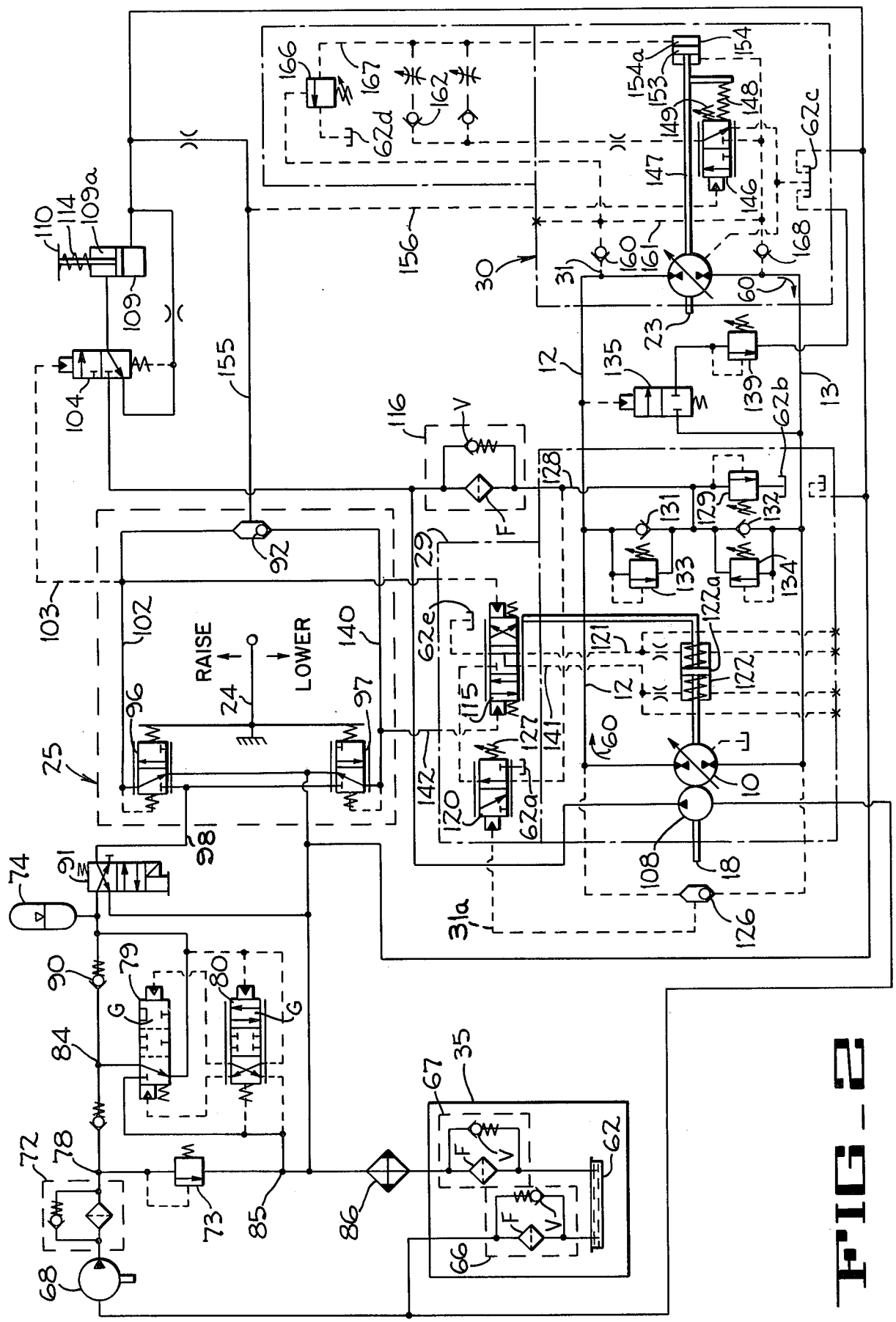
FIG_2

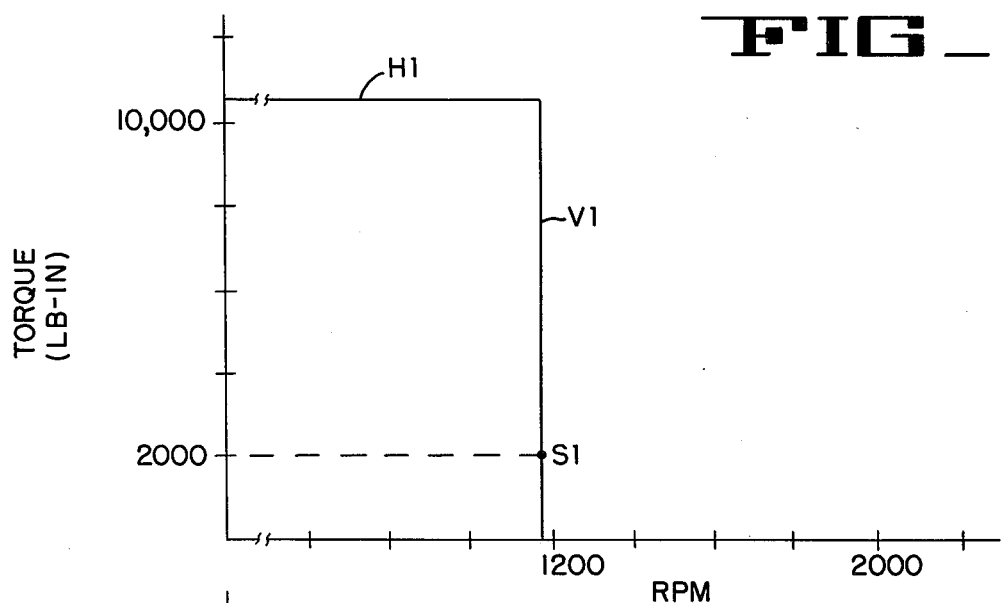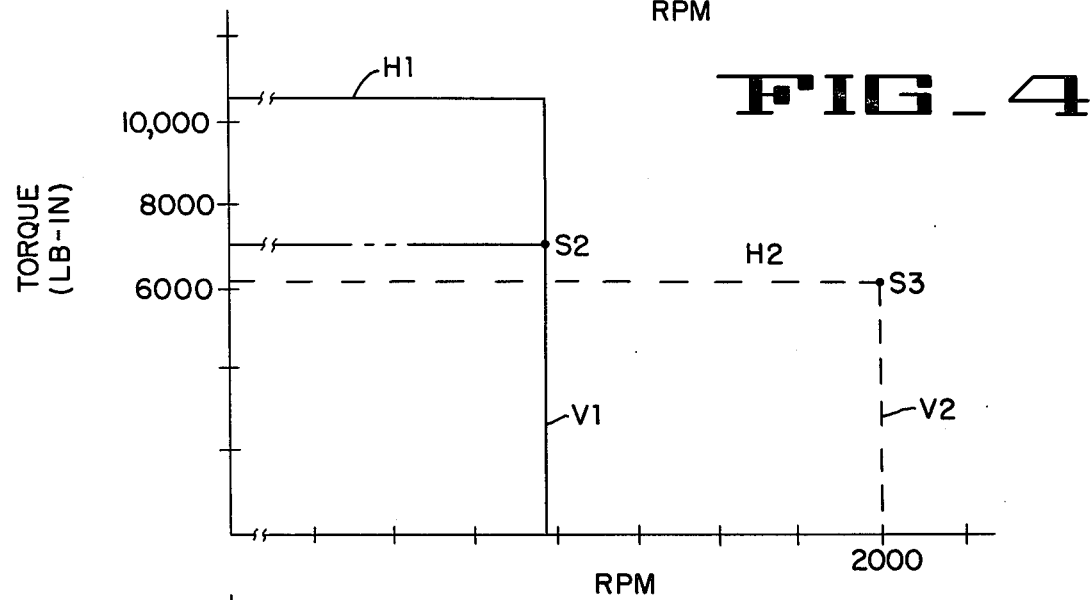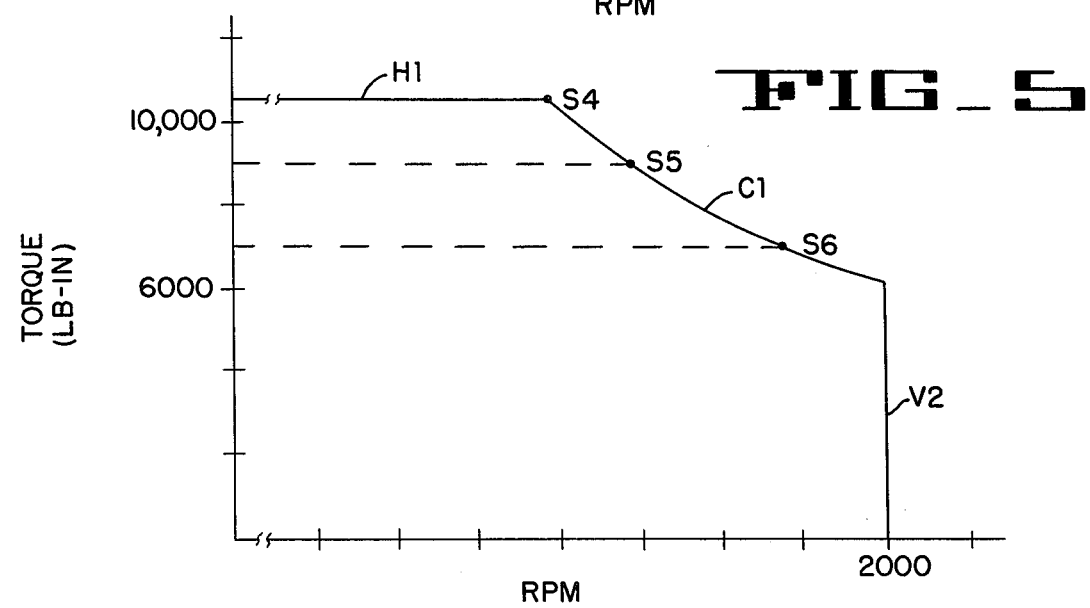

HYDRAULIC WINCH SPEED CONTROL WITH PRESSURE-RESPONSIVE OVERRIDE

BACKGROUND OF THE INVENTION

1. Field of the Invention

The present invention relates to cranes using wire ropes to support loads, and more particularly, to a system for controlling the speed of a motor used to lift the loads.

2. Description of the Prior Art

In tower cranes, truck cranes and other types of cranes, hydraulic motors are used to operate cylindrical drums which reel and unreel wire ropes to hoist and lower loads attached to an outer end of the wire ropes. The hydraulic motors are powered by pressurized hydraulic fluid provided by hydraulic pumps connected to diesel or other engines mounted on the crane. The system may include a fixed displacement motor and a variable displacement pump with the motor and drum speed being determined by the displacement of the pump. A disadvantage of the fixed displacement motor-variable displacement pump is that a large horsepower engine is required to operate the system if high speeds and high torques are to be obtained from the hydraulic motor.

Other cranes use a variable displacement pump and a variable displacement motor to obtain higher operating speeds without using large horsepower engines as long as the load lifted by the crane is fairly light. The variable displacement pump-variable displacement motor combination can also provide relatively high torques at lower speeds if required. However, the hydraulic motor can stall if a crane operator tries to obtain a high speed with a heavy load.

SUMMARY OF THE INVENTION

The present invention alleviates some of the disadvantages of the prior art systems by providing a variable displacement pump connected to a variable displacement motor to operate the wire drum and includes a feedback system which reduces the likelihood of stalling if a crane operator tries to operate at too high a speed. The present invention includes a pump control connected to the variable displacement pump for varying the pump displacement and a motor control connected to vary the displacement of the motor. Operation of this system starts with the motor in the maximum displacement position and with the pump in the minimum displacement position. The pump displacement is increased to increase motor speed at a constant torque until the pump reaches maximum displacement. The motor displacement is then reduced to increase motor speed. If a crane operator tries to increase motor speed to a point where the motor cannot handle the load, the motor can still stall. An override circuit in the present invention monitors the hydraulic pressure to the motor and increases motor displacement when the motor approaches a stalling condition.

BRIEF DESCRIPTION OF THE DRAWINGS

FIG. 1 is a schematic illustration of a system of the present invention for controlling speed of a wire rope drum and for preventing motor stalling due to operator errors.

FIG. 2 is a circuit disclosing details of the system shown in FIG. 1.

FIG. 3 shows the operating characteristics of a single-speed prior art control system.

FIG. 4 shows the operating characteristics of a two-speed prior art control system.

FIG. 5 discloses the operating characteristics of the motor control system of the present invention.

DESCRIPTION OF THE PREFERRED EMBODIMENT

The system for controlling the speed of a rotatable load, disclosed in FIG. 1 includes a variable displacement pump 10 connected to a variable displacement motor 11 by a pair of hydraulic lines 12, 13. A diesel engine or other power source 17 is connected to the pump 10 by a rotatable shaft 18 and the motor 11 is connected to a wire rope drum or other load 19 by a rotatable shaft 23. Moving a control lever 24 to the right or to the left from a neutral position shown in FIG. 1 causes a hoist control circuit 25 to provide "raise" or "lower" signals to a pump displacement control 29 and to a motor displacement control 30. A feedback line 31 connected between the hydraulic line 12 and the motor displacement control 30 provides a signal which overrides the control signals provided by the hoist control circuit 25 and prevents the motor 11 from stalling when the control lever 24 is moved too far from the neutral position. A feedback line 31a, connected between the hydraulic line 12 and the pump displacement control 29, provides a signal that overrides the control signals from hoist circuit 25 to destroke the pump when the pressure in line 12 reaches a predetermined upper value. An oil supply 35 replaces any oil which may escape from the hydraulic lines 12, 13.

The variable displacement pump 10 and the variable displacement motor 11 are available from several manufacturers. One such pump which can be used with the present invention is a model A4V125HD1L040 from the Rexroth Corporation, Bethlehem, Penna. and one such motor which can be used is the model MV26 from the Sundstrand-Hydro Transmission Corporation, Ames, Iowa. Even though the pump and motor are available from several manufacturers, the general construction and operation of the variable displacement pump will be described to illustrate how displacement is varied.

The pump 10 (FIG. 1) includes a generally cylindrical housing 36 having a shaft 37 rotatably mounted in a central bore 41 in one end of the housing 36. A rotatable cylinder 42 is mounted on the shaft 37 and rotates with the shaft 37. The radially outer portion of the cylinder 42 is mounted between a pair of radially inward housing flanges 43, 44. The cylinder 42 includes a plurality of axial bores 48a–48n (only two shown in FIG. 1) each having a piston 49a–49n slidably mounted therein. Each of the pistons 49a–49n is connected to a base plate 50 by a connecting rod 54a–54n and the base plate 50 is rotatably mounted in a cam plate 55. The base plate 50 is connected to the shaft 37 by a universal joint 56 and the cam plate 55 is connected to the housing 36 by means not shown, with the cam plate 55 pivotable about an axis A.

When the shaft 37 of the pump 10 rotates, the cylinder 42 and the base plate 50 rotate along with the shaft 37. The cam plate 55 remains in the fixed position shown (FIG. 1) causing the pistons 49a–49n to move axially in the bores 48a–48n and to pump fluid from line 13 through the pump 10 into line 12 in the clockwise direction shown by the arrow 60. The fluid flows from line 12 through the motor 11 to line 13 causing the motor to rotate in a first direction and to wind a wire rope 61 onto the drum 19.

When the cam plate 55 is pivoted counterclockwise about an axis A into a position at right angles to an axis B the pistons 49a–49n do not move inside the bores 48a–48n and fluid no longer flows in the lines 12, 13. This is the zero displacement position. If the cam plate 55 is slowly moved from the position shown in FIG. 1 into the zero displacement position, the pistons 49a–49n slowly change from moving through a relatively large displacement in the bores 48a–48n to no displacement so the fluid flow slowly changes from a large flow through the pump to no flow.

When the cam plate 55 is further pivoted counterclockwise about axis A until the upper portion 55a is closer to the flange 44 than the lower portion 55b is to the housing flange 44, the fluid flow through the pump 10 reverses and fluid flows counterclockwise in the loop comprising lines 12, 13.

When the motor control lever 24 is in the neutral position shown in FIG. 1 the cam plate 55' of the motor 11 is tilted about the axis C to place the motor into maximum displacement and the pump 10 is placed in the minimum (zero) displacement position. With the pump in minimum displacement there is no fluid flow through the pump and the motor and the motor shaft 23 and drum 19 remain at rest.

As the lever 24 (FIG. 1) is moved toward the right the hoist control circuit 25 provides signals which cause the pump displacement control 29 to tilt the cam plate 55 clockwise about the axis A which increases the pump displacement causing fluid to flow through the lines 12, 13 and downward through the motor 11. A downward flow of fluid in the motor 11 causes the motor to rotate the drum 19 and to wind the rope 61 onto the drum thereby hoisting a load (not shown) at the outer end of the wire rope 61.

Further movement of the control lever 24 (FIG. 1) to the right increases the displacement of the pump 10 to supply more fluid to increase motor speed. When the pump 10 reaches maximum displacement a further movement of the control lever 24 to the right supplies a signal which causes the motor displacement control 30 to reduce the motor displacement (destroke the motor) by moving the cam plate 55' toward an upright position; and increases motor speed. As the motor is destroked the torque capability decreases, and if the motor is destroked too far the motor could stall and lose control of a heavy load. A stalled or slow moving motor allows only a small amount of fluid to flow therethrough so the pressure in the hydraulic line 12 increases and supplies a feedback signal to the motor displacement control 30 through the feedback line 31. The feedback signal causes the motor displacement to increase and increases motor torque capability to prevent motor stall.

Details of the apparatus for controlling the variable displacement pump 10 and the variable displacement motor 11 and for preventing motor stall are disclosed in FIG. 2. The oil supply 35 includes an oil reservoir 62, a suction strainer 66 and an oil filter assembly 67. The strainer 66 and filter assembly 67 each includes a filter F and a bypass valve V. Pressure regulated fluid for controlling operation of the system is provided by a hydraulic pump 68, an oil filter assembly 72, a pressure relief valve 73 and an accumulator 74. In the embodiment shown the pressure relief valve 73 is set for 1250 psi so the pressure at a junction point 78 never exceeds 1250 psi. A pair of pilot valves 79, 80 combine to hold the accumulator pressure between 900 psi and 1050 psi when the pump 68 is operating. If the pressure at the accumulator 74 reaches 1050 psi, the spool valve 80 shifts to the left causing section G of the valve 80 to connect the accumulator 74 to the right side pilot of valve 79. The valve 79 then shifts to the left so that section G of the valve 79 interconnects junction points 84, 85 to shunt oil from junction point 84 through an oil cooler 86 to the reservoir 62 and reduces the pressure applied to the accumulator 74.

When the pressure at the accumulator 74 (FIG. 2) is below 900 psi the valves 79, 80 move into the positions shown so that the valve 79 bypasses a springloaded check valve 90 to provide pressurized fluid to the accumulator. When the pressure at the accumulator 74 is between 900 psi and 1050 psi the valve 80 is centered so valve 79 remains in the position it was last in, either shuttling oil from junction 84 to junction 85 or from junction 84 to the accumulator. Fluid from the accumulator 74 is coupled to the hoist control circuit 25 by a shut down control valve 91 when the valve 91 is moved to the upward position.

The hoist control circuit 25 includes a shuttle valve 92 (FIG. 2) and a pair of pilot pressure metering valves 96, 97. The metering valves each provides an output pressure which is proportional to the displacement of the control lever 24 away from a neutral (horizontal) position (FIG. 2). When the control lever 24 is moved upward from the neutral position shown in FIG. 2, pressure from an input line 98 is coupled through the metering valve 96 to a hydraulic line 102, through a pilot line 103 to move a brake valve 104 downward causing the valve 104 to couple pressurized fluid from a pump 108 to an upper portion 109a of a brake cylinder 109. Pressure in the upper portion 109a releases a brake 110 which is normally pressed against the wire rope drum 19 (FIG. 1) by a spring 114 (FIG. 2).

The pressure in line 102 (FIG. 2) is coupled to the pilot at the right end of a valve 115 causing the valve 115 to shift to the left and to couple pressurized fluid from the pump 108 through an oil filter assembly 116, a metering valve 120 and a line 121 to the right end of a positioning cylinder 122 (FIG. 2) causing the cam plate 55 (FIG. 1) to tilt away from a vertical position and increase the displacement of pump 10. The left end of the cylinder 122 is connected to a reservoir 62e by the valve 115. The pump 10 provides fluid to hydraulic line 12 (FIGS. 1, 2) causing the motor 11 to rotate and wind rope 61 (FIG. 1) onto the drum 19. The displacement of valve 115 away from the neutral position shown in FIG. 2 is proportional to the difference between the pressure in line 102 and the pressure in line 140. The pressure of the fluid coupled by line 121 to the pump positioning cylinder 122 and therefore the displacement of the pump 10 is proportional to the displacement of valve 115 and the mechanical feedback line between 122a and 115. The pressurized fluid in the hydraulic line 12 is coupled through a shuttle valve 126 to a pilot of valve 120. If the pressure in line 12 exceeds a predetermined value the valve 120 shifts to the right and connects the line 121 (from the pump 10) to a reservoir 62a causing a piston 122a in the cylinder 122 to move to the right thereby reducing pump displacement. The pressure at which the valve 120 shifts is determined by the setting of an adjustable valve spring 127.

The pressure of the fluid from pump 108 is regulated by a pressure relief valve 129 which returns fluid from a hydraulic line 128 to a reservoir 62b when fluid pressure from pump 108 exceeds a predetermined value. If the fluid in lines 12, 13 is too low, fluid from line 128 is coupled through one of a pair of check valves 131, 132 to lines 12, 13. When pressure in line 12 exceeds pressure in line 13 by a predetermined value fluid flows through valves 133, 132 to line 13. When pressure in line 13 exceeds pressure in line 12 by a predetermined value fluid flows through valves 134, 131 to line 12. When the fluid pressure in line 12 is at a normal value this pressure causes a spool valve 135 to shift downward and conduct fluid from line 13 through valve 135 and through a pressure relief valve 139 to a reservoir 62c and through the oil cooler 86 to keep the oil in lines 12, 13 at a proper temperature.

When the control lever 24 is moved downward from the position shown in FIG. 2, pressure from the input line 98 is coupled through the metering valve 97 to a hydraulic line 140, through a pilot line 142 to the left end of the valve 115 causing the valve 115 to shift to the right and to couple pressurized fluid from the pump 108 through the oil filter assembly 116, the valve 120 and the line 141 to the left end of positioning cylinder 122 (FIG. 2) causing the cam plate 55 (FIG. 1) to tilt counterclockwise away from a vertical position and to increase pump displacement. The right end of the cylinder 122 is connected to the reservoir 62e by the valve 115. The pump 10 provides fluid to hydraulic line 13 (FIGS. 1, 2) causing the motor 11 to rotate and unwind wire rope 61 (FIG. 1) from the drum 19.

The motor displacement circuit 30 (FIG. 2) includes a metering valve 146 connected to a rod 147 by a spring 148 and the rod 147 is coupled to the cam plate 55′ (FIG. 1). The spring 148 biases the rod 147 toward the right to hold the cam plate 55′ (FIG. 1) in a tilted position and provide maximum piston displacement for the motor 11. As the lever 24 is progressively moved toward the raise position, the pressure in line 102 progressively increases, as described above, causing the pump 10 to reach maximum displacement and with the motor remaining at maximum displacement. A further movement of the control lever 24 causes a pressure on line 102 to increase and this pressure is coupled through the shuttle valve 92, by a pair of lines 155, 156 to the pilot of valve 146, causing the valve 146 to shift slightly to the right. The pressure required to cause the valve to shift is determined by a spring 149 and the distance the valve 146 moves is proportional to the pressure on line 156. Pressurized fluid from line 12 is coupled through a check valve 160, through a line 161, valve 146 and a check valve 162 to a right end 154a of the cylinder 154 biases the piston 153 and rod 147 toward the left. Moving the rod 147 (FIG. 2) to the left moves the cam plate 55′ (FIG. 1) toward a vertical position and reduces the piston displacement of the motor 11 thereby increasing motor speed. Since the motor torque or load equals the motor displacement times the hydraulic pressure applied to the motor, the motor pressure increases as the motor displacement is reduced if the motor load remains relatively constant.

As the control lever 24 (FIG. 2) is moved further from the neutral position the motor displacement decreases further causing the fluid pressure in line 12 to increase further, and such pressure could cause damage to the system if the load on the motor is too large for the speed selected. The motor control circuit 30 includes a feedback circuit which protects the system against high fluid pressures and prevents motor stalls by increasing motor displacement so the motor can safely handle the motor load. When the pressure in line 12 increases above a predetermined value a release valve 166 in motor control 30 is energized by pressure coupled through the valve 160 causing the release valve 166 to connect a line 167 to a reservoir 62d and to release the pressure in the portion 154a of the cylinder 154. The piston 153 moves toward the right to increase motor displacement and prevent the motor from stalling.

When the hydraulic circuit disclosed in FIG. 2 is used for lifting loads with a wire rope crane, the fluid pressure in line 12 is always greater than the fluid pressure in line 13 because during the hoisting operation the pump 10 supplies fluid to line 12 to operate the motor, and during the lowering operation the pump acts as a brake for the motor to prevent free-fall of the load. During the lowering operation the motor pushes fluid through line 12 to the pump. However, the system disclosed in FIG. 2 can be used with other motor control operations where the motor 11 is powered in first one direction and then the other by the pump 10, by changing the pump displacement either direction from the zero displacement position. In these bidirectional powered operations the pressure on line 13 may be greater than the pressure on line 12 so another check valve 168 is needed between the line 13 (FIG. 2) and the line 161 of motor control 30 to provide feedback control of the motor 11.

Some of the advantages of the present invention over the prior art can be seen by comparing the performance curves of prior art systems of FIGS. 3 and 4 with the performance curve of the present invention as disclosed in FIG. 5. When a fixed displacement motor and a variable displacement pump are used, the speed vs. torque characteristic of a 190 drum horsepower motor are as shown in FIG. 3. The motor can operate at any point inside the curve between the horizontal line H1 and the ordinate, and between the vertical line V1 and the abscissa of the rectangular coordinates. For example, if the load is 2,000 lb. in. the speed can be varied from 0 to 1,175 RPM along the dotted line between the abscissa and point S1.

If a two speed hydraulic 190 horsepower motor is used with a variable displacement pump the motor can operate either within the area enclosed by lines H1, V1 or within the area enclosed by lines H2, V2 as shown in FIG. 4. On the high speed position the motor speed can reach a maximum speed of 2,000 RPM with a maximum load of a little over 6,000 lb. in. However, if the load is 7,000 lb. in., the motor must be set on the low speed position where the maximum speed is 1,175 RPM.

With applicants' variable displacement motor and variable displacement pump, a 190 horsepower motor can operate anywhere within the area (FIG. 5) between the lines H1, C1, V2 of the curve and the ordinate and abscissa, to provide a considerable wider range of speed and torque than in the prior art motor control systems. For example, if the load is 9,000 lb. in. the speed can be varied from 0 to 1,300 RPM along the dotted line between the abscissa and point S5; or if the load is 7,000 lb. in. the speed can be varied from 0 to 1,750 RPM along the dotted line between the abscissa and point S6.

The present invention includes a hydraulic variable displacement pump and motor combination for use with a crane. The motor is at maximum displacement and the pump at minimum displacement when a system control lever is in a neutral position. The motor displacement remains at maximum and the pump displacement is increased to increase motor speed. After the pump reaches maximum displacement motor displacement is decreased to further increase motor speed. The reduction in motor displacement causes an increase in fluid pressure which could damage the system if the load on the motor is too large. A feedback circuit protects the system and prevents motor stalls by increasing motor displacement so the motor can safely handle the motor load.

Although the best mode contemplated for carrying out the present invention has been herein shown and described, it will be apparent that modification and variation may be made without departing from what is regarded to be the subject matter of the invention.

What is claimed is:

1. A system for controlling the speed of a rotatable load and for preventing the load from stalling when an operator tries to move the load at too fast a rate, said system comprising:
   a variable displacement hydraulic motor coupled to said load;
   a variable displacement hydraulic pump;
   means for connecting said pump to said motor;
   power means for operating said pump;
   a pump control for controlling the displacement of said pump to control the fluid supplied to said motor;
   a motor control for adjusting the displacement of said motor to control the speed of said motor; and
   an override circuit for sensing the motor operation and for overriding said motor control in controlling the displacement of said motor to prevent said motor from stalling.

2. A control system as defined in claim 1 including means for setting said motor displacement at a maximum value and setting said pump displacement at a minimum value when said motor is at a rest condition and means for increasing said pump displacement to obtain rotational movement of said motor.

3. A control system as defined in claim 1 including means for connecting a single control lever to said pump control and to said motor control to control the displacements of said pump and of said motor.

4. A control system as defined in claim 1 including means for connecting a single control lever to said pump control and to said motor control to provide control signals to increase motor speed as said lever is moved further from a neutral position, and feedback means connected to said motor control to prevent said motor from stalling by overriding said control signals.

5. A hydraulic system for controlling the speed of a rotatable load and for preventing the load from stalling when an operator tries to move the load too fast, said system comprising:
   a variable displacement hydraulic motor coupled to said load;
   a variable displacement hydraulic pump which can be displaced either side of a zero displacement position to selectively provide a pressurized fluid in either of two directions;
   power means for operating said pump;
   means for connecting said pump to said motor to rotate said motor in either of two directions as determined by the direction of fluid provided by said pump;
   a pump control for controlling the displacement of said pump to control the amount and direction of the fluid supplied to said motor;
   a motor control for adjusting the displacement of said motor to control the speed of said motor; and
   a feedback circuit for sensing the motor operation and for overriding said motor control to increase motor displacement when said motor approaches a stall condition.

6. A control system as defined in claim 5 including a hoist control circuit, a control lever connected to said hoist control circuit, said control lever causing said hoist control to generate hoist control signals in response to a displacement of said control lever from a neutral position, means for coupling said hoist control circuit to said motor control and to said pump control, said hoist control signals causing said pump control and said motor control to adjust the displacements of said pump and said motor.

7. A control system as defined in claim 6 wherein a relatively small displacement of said control lever from said neutral position causes a corresponding increase in said pump displacement and a relatively large displacement of said control lever causes a change in displacements of both said pump and said motor.

8. A control system as defined in claim 6 including means for setting said motor displacement at a maximum value and setting said pump displacement at a minimum value when said control lever is at said neutral position, and means for increasing said pump displacement to obtain rotational movement of said motor when said control lever is moved from said neutral position.

9. A control system as defined in claim 5 including means for setting said motor displacement at a maximum value and setting said pump displacement at a minimum value to place said motor in a stop position, means for increasing said pump displacement to increase motor speed, and means for decreasing motor displacement after said pump displacement has reached a maximum value to further increase motor speed.

10. A control system as defined in claim 9 including feedback means connected to said motor, said feedback means having means for sensing system pressure and for increasing motor displacement to aid in preventing the motor from stalling.

* * * * *